(12) United States Patent
Hui et al.

(10) Patent No.: US 7,045,189 B2
(45) Date of Patent: May 16, 2006

(54) MOLDING FOR AUTOMOTIVE APPLICATION

(75) Inventors: Paul Hui, Toronto (CA); William J. Raymor, Whitby (CA)

(73) Assignee: General Motors of Canada Limited, Oshawa (CA)

(*) Notice: Subject to any disclaimer, the term of this patent is extended or adjusted under 35 U.S.C. 154(b) by 143 days.

(21) Appl. No.: 10/646,211

(22) Filed: Aug. 22, 2003

(65) Prior Publication Data

US 2005/0042418 A1 Feb. 24, 2005

(51) Int. Cl.
*B32B 3/06* (2006.01)

(52) U.S. Cl. .................. 428/99; 428/217; 49/495.1; 49/489.1; 49/498.1; 52/466; 52/468; 296/93; 296/210; 296/213

(58) Field of Classification Search .............. 428/36.9, 428/99, 217; 296/213, 93, 210; 49/489.1, 49/492.1, 495.1, 496.1, 498.1; 52/466, 468
See application file for complete search history.

(56) References Cited

U.S. PATENT DOCUMENTS

| 5,013,083 A | 5/1991 | Yada et al. | 296/213 |
| 6,210,615 B1 | 4/2001 | Yoshizuru et al. | 264/138 |
| 6,224,145 B1 | 5/2001 | Sugiura | 296/210 |
| 6,684,574 B1 * | 2/2004 | Hayashi | 49/490.1 |

OTHER PUBLICATIONS

2003 Toyota Camry molding.
2003 Honda Civic molding.

* cited by examiner

*Primary Examiner*—Alexander S. Thomas
(74) *Attorney, Agent, or Firm*—Laura C. Hargitt

(57) ABSTRACT

A molding for closing a recess between a pair of body panels includes a head portion, a stem portion, and at least one leg member. The head portion has a width sufficient to close the opening when the molding is installed in the recess. The stem portion can be formed of a harder plastic material than the leg member and has a width enabling the stem portion to pass through an opening in the recess. The leg member is formed of a softer material and extends from the stem portion for frictional engagement with the side wall of the recess. A living hinge can be formed in the leg member to facilitate deflection of the leg member during insertion.

12 Claims, 4 Drawing Sheets

MOLDING FOR AUTOMOTIVE APPLICATION

BACKGROUND OF THE INVENTION

The present invention relates generally to molding assemblies and the like and, in particular, to a molding for an automotive application that achieves maximum retention for the molding.

Moldings, which are placed in a recess such as a recess between adjoining body panels in an automobile body, are well known. Moldings are utilized for minimizing water and/or foreign object intrusion into the recess as well as for the aesthetic purpose of covering the recess from the customer's view in the final product.

Prior art single piece moldings are disadvantageously easy to remove after installation. Prior art multiple piece design moldings improved the retention of the moldings but resulted in more process and installation steps and effort such as the use of double-sided adhesive tape and machine rollers to retain the molding in the recess.

The prior art moldings disadvantageously fail to maximize the retention of the pressfit molding. Prior art moldings also fail to reduce the lateral movement of the molding after installation and to absorb the lateral variation, which is the variation of the width of the recess created between the adjoining body panels.

It is desirable, therefore, to provide a molding that is able to be press fit into a recess, such as a roof ditch or the like. It is also desirable to provide a molding that can maximize the retention of the press-fit molding, reduce the lateral movement of the molding, and absorb the lateral variation of the recess.

SUMMARY OF THE INVENTION

The present invention concerns a molding for closing a recess between a pair of body panels includes a head portion, a stem portion, and at least one leg member. The head portion has a width sufficient to close the opening when the molding is installed in the recess. The stem portion can be formed of a harder plastic material than the leg member and has a width enabling the stem portion to pass through an opening in the recess. The leg member is formed of a softer material and extends from the stem portion for frictional engagement with the side wall of the recess. A living hinge can be formed in the leg member to facilitate deflection of the leg member during insertion.

The molding in accordance with the present invention is advantageously operable to be press-fit into the recess during installation of the molding. Preferably, the interior surface of the recess includes a back drafted metal section for engagement with the leg members. The back drafted metal section provides a mechanical trap for the molding leg members to engage within the recess.

The molding in accordance with the present invention absorbs the maximum cross-car lateral variation of the recess so the molding can press fit into the ditch and advantageously hide the variation from customer view. The deformable softer material of the leg members of the molding also advantageously minimizes the effort required to install the molding into the recess. The molding in accordance with the present invention also minimizes the height of the molding so to minimize the packaging requirement. An embodiment of the molding implements a built-in centering feature so the molding will self center once installed in the recess, advantageously reducing the number of adjustments after installation.

The molding in accordance with the present invention provides a more cost effective one-piece molding design for the recess. The present invention also advantageously eliminates some current steps with the current molding installation process.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
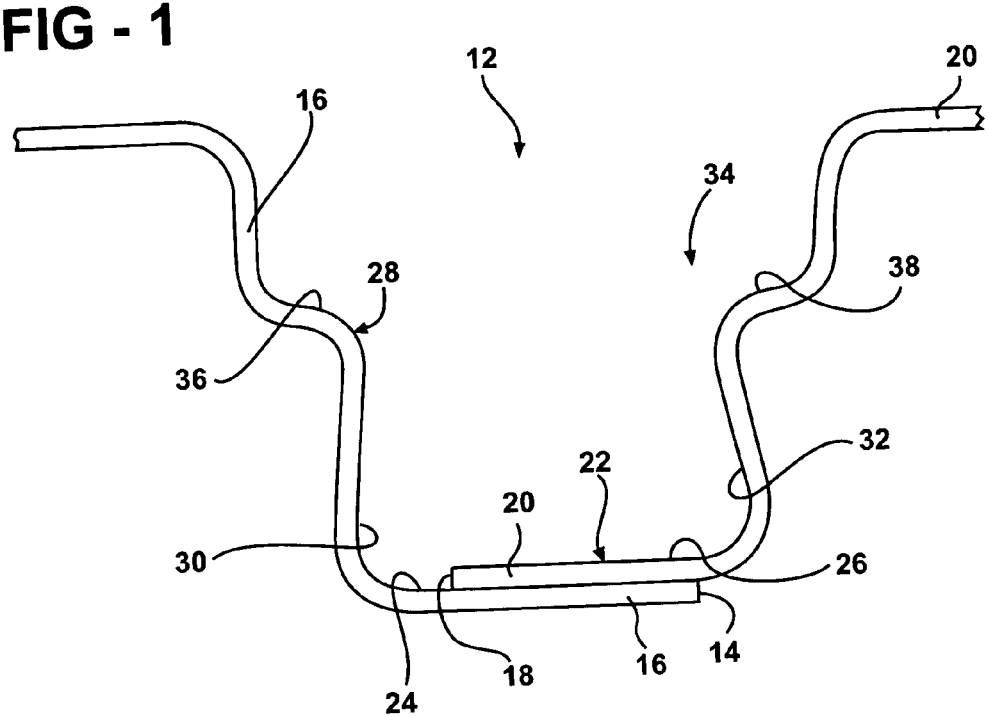
FIG. 1 is a fragmentary cross-sectional view of a pair of joined body panels forming a recess therebetween.
Figure 2:
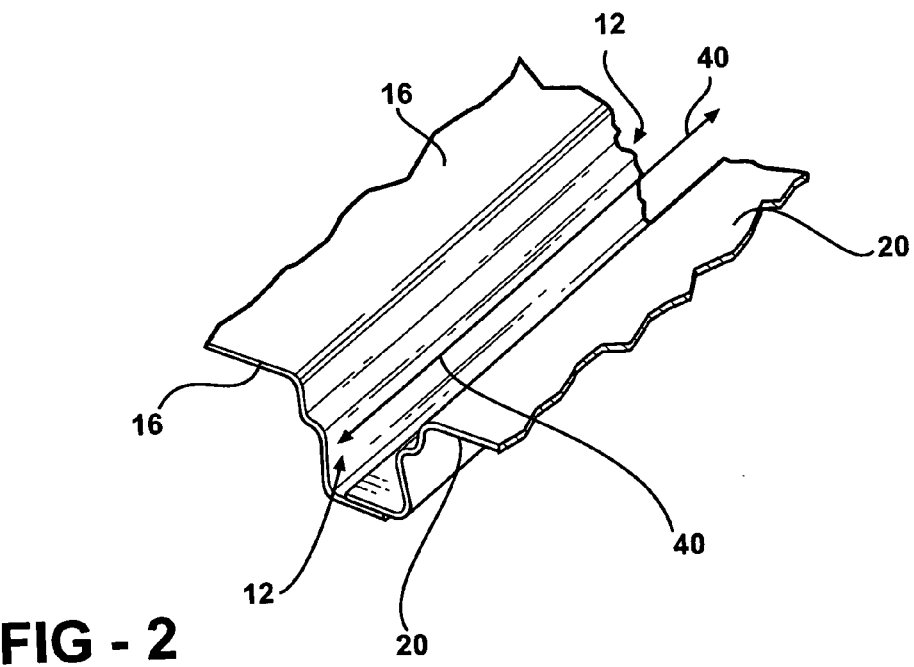
FIG. 2 is a fragmentary perspective view of the joined body panels shown in FIG. 1.
Figure 3:
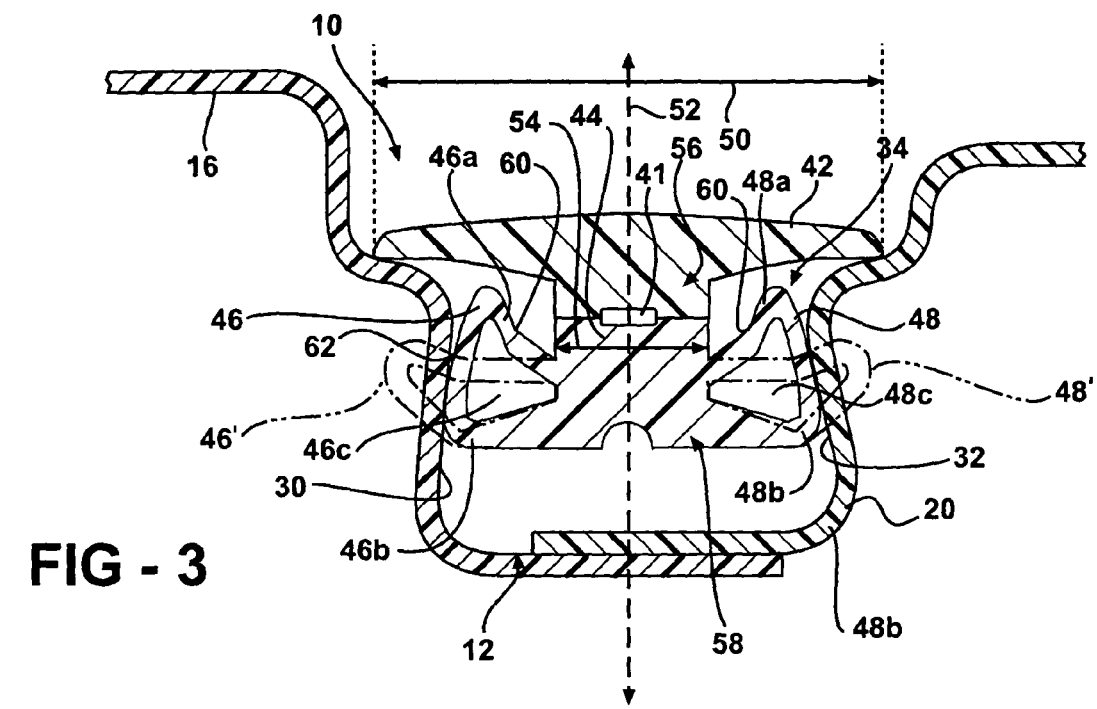
FIG. 3 is a fragmentary cross-sectional view of a molding member in accordance with the present invention shown installed in the recess of FIG. 1.

Referring now to FIGS. 1–3, a molding in accordance with the present invention, which is operable to be installed in a recess 12, is indicated generally at 10. Best seen in FIG. 1, the recess 12 extends along an edge 14 of a first vehicle body panel 16 and an edge 18 of a second vehicle body panel 20. The edges 14 and 18 are overlapped and are joined by welding or the like. Alternatively, the edges 14 and 18 abut one other. The recess 12 can include, but is not limited to, a roof ditch area formed between a roof panel and a side body panel. A lower portion 22 of the recess 12 is defined where a lower edge 24 of the first body panel 16 is joined to a lower edge 26 of the second body panel 20. An upper portion 28 of the recess 12 is defined where a side wall 30 of the first body panel 16 and a side wall 32 of the second body panel 20 divergently extend from an opening 34 between an outer surface 36 of the first body panel 16 and an outer surface 38 of the second body panel 20. The side walls 30 and 32 divergently extend from the opening 34 to the lower edges 24 and 26. The recess 12 extends along a longitudinal axis 40, best seen in FIG. 2, between the first body panel 16 and the second body panel 20. Alternatively, the side walls 30 and 32 do not divergently extend from the opening 34 to the lower edges 24 and 26.

Best seen in FIG. 3, the molding 10 includes a head portion 42, a stem portion 44, a first leg member 46, and a second leg member 48. The head portion 42 extends in a first plane that is substantially parallel to the longitudinal axis 40 (FIG. 2) of the recess 12. The head portion 42 has a width 50 sufficient to close the opening 34 when the molding 10 is installed in the recess 12. The stem portion 44 is preferably formed of a harder PVC or similar plastic material and extends in a second plane 52 at an angle relative to the first plane and has a width 54 enabling the stem portion 44 to pass through the opening 34. The stem portion 44 includes a first or upper longitudinal edge 56 and a second or lower longitudinal edge 58. The head portion 42 is attached at the first longitudinal edge 56 of the stem portion 44. The leg members 46 and 48 are preferably formed of a softer PVC or similar plastic material and extend outwardly from opposite sides of the stem portion 44 adjacent to the second longitudinal edge 58 of the stem portion 44 for frictional engagement with the opposed side walls 30 and 32 of the recess 12. The first leg member 46 and the second leg member 48 are shown in a deflected, engaged position in the recess 12. An imaginary line 46' and an imaginary line 48' show the location of the first leg member 46 and the second leg member 48 in an extended, pre-engaged position prior to insertion into the recess 12. The leg members 46 and 48 have an upper leg portion 46a, 48a and a lower leg portion 46b, 48b defining an empty cavity 46c, 48c therebetween. A living hinge portion 60 is formed in each of the leg portions 46a and 48a to facilitate folding. The molding 10 is preferably co-extruded in one piece.

The molding 10 includes a reinforcement member 41, such as metal foil or a metal wire, extending longitudinally therethrough. The reinforcement member 41 is operable to provide stiffness to the molding 10 and to constrain the plastic material of the molding 10 from thermal expansion.

When the second longitudinal edge 58 of the stem portion 44 is inserted into the recess 12 through the opening 34, the leg members 46 and 48 bend or deflect toward the stem portion 44, at their respective living hinge portions 60, to pass through the opening 34. After passing through the opening 34, the leg members 46 and 48 resiliently spring away from the stem portion 44 to frictionally engage the opposed walls 30 and 32 of the recess 12 to retain the molding 10 in the recess 12. Any attempt to remove the molding 10 from the recess 12 will tend to rotate the leg members 46 and 48 about the living hinge portions 60 toward the filly extended position thereby further opposing the removal attempt. An exterior surface of the leg members 46 and 48 is alternatively provided with a textured surface 62 to increase the coefficient of friction between the engaging surfaces of the leg members 46 and 48 and the opposed walls 30 and 32 and increase the retaining force of the molding 10.

Figure 4:
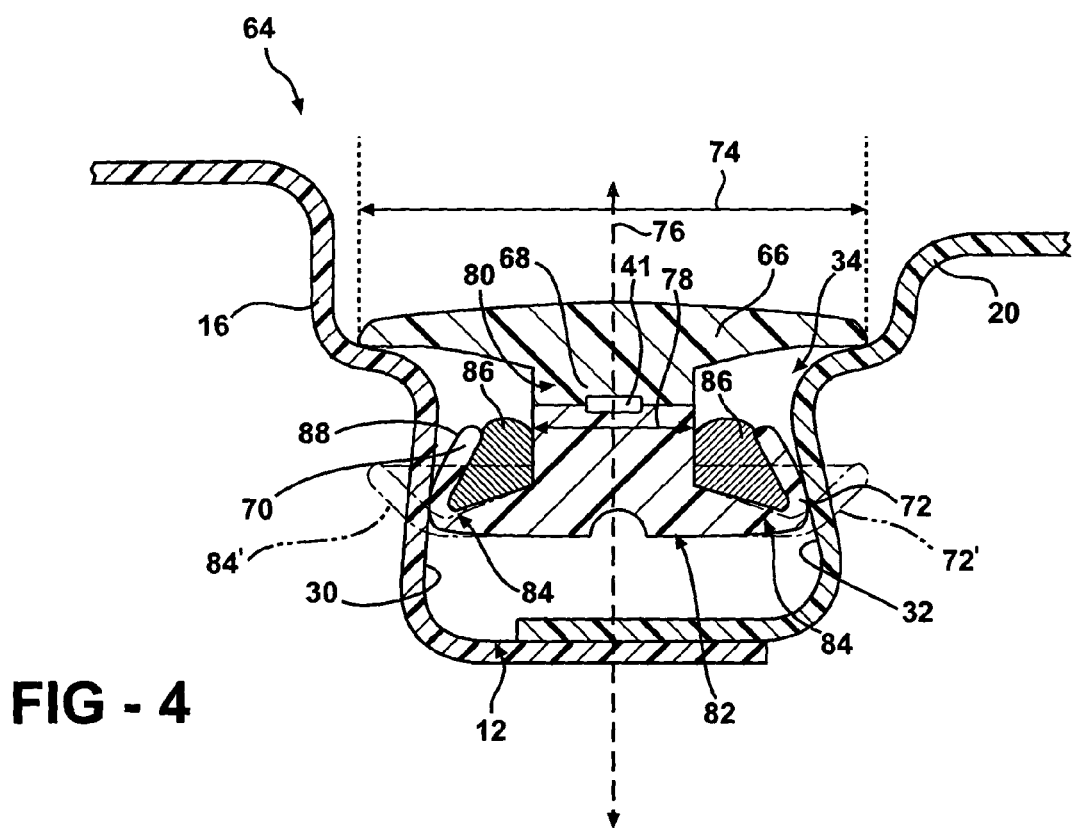
FIG. 4 is a fragmentary cross-sectional view of an alternative embodiment of a molding member in accordance with the present invention shown installed in the recess of FIG. 1.

Referring now to FIG. 4, an alternative embodiment of a molding in accordance with the present invention is indicated generally at 64. The molding 64 is adapted to be installed in the recess 12 and includes a head portion 66, a stem portion 68, a first leg member 70, and a second leg member 72. The head portion 66 extends in a first plane that is substantially parallel to the longitudinal axis 40 of the recess 12, best seen in FIG. 2. The head portion 66 has a width 74 sufficient to close the opening 34 when the molding 64 is installed in the recess 12. The stem portion 68 is preferably formed of a harder plastic material and extends in a second plane 76 at an angle relative to the first plane and has a width 78 enabling the stem portion 68 to pass through the opening 34. The stem portion 68 includes a first longitudinal edge 80 and a second longitudinal edge 82. The head portion 66 is attached at the first longitudinal edge 80 of the stem portion 68. The leg members 70 and 72 are preferably formed of a softer plastic material and extend outwardly from opposite sides of the stem portion 68 adjacent to the second longitudinal edge 82 of the stem portion 68 for frictional engagement with the opposed side walls 30 and 32 of the recess 12. The first leg member 70 and the second leg member 72 are shown in a deflected, engaged position in the recess 12. An imaginary line 70' and an imaginary line 72' show the location of the first leg member 70 and the second leg member 72 in an extended, pre-engaged position prior to insertion into the recess 12. A living hinge portion 84 is formed in each of the leg members 70 and 72 to facilitate folding. The molding 64 is preferably co-extruded in one piece, and the stem portion 68 alternatively includes a metallic foil or wire (not shown) disposed therein. The leg members 70 and 72 each include a foam material 86 disposed on respective upper surfaces thereof and an exterior surface of the stem portion 68.

The molding 64 includes a reinforcement member 41, such as metal foil or a metal wire, extending longitudinally therethrough. The reinforcement member 41 is operable to provide stiffness to the molding 64 and to constrain the plastic material of the molding 64 from thermal expansion.

When the second longitudinal edge 82 of the stem portion 68 is inserted into the recess 12 through the opening 34, the leg members 70 and 72 bend toward the stem portion 68, at their respective living hinge portions 84, to pass through the opening 34. After passing through the opening 34, the leg members 70 and 72 spring away from the stem portion 68 to frictionally engage the opposed walls 30 and 32 of the recess 12 to retain the molding 64 in the recess 12. When the leg members 70 and 72 are bent toward the stem portion 68, the foam material 88 is compressed. When the leg members 70 and 72 are free to spring back, the compressed foam material 86 provides additional pressure to force the leg members toward the opposed side walls 30 and 32. The foam material 86 also self-centers the molding 64 in the lateral direction of the recess 12. An exterior surface of the leg members 70 and 72 is alternatively provided with a textured surface 88 to increase the coefficient of friction between the engaging surfaces of the leg members 70 and 72 and the opposed walls 30 and 32 and increase the retaining force of the molding 64.

Figure 5:
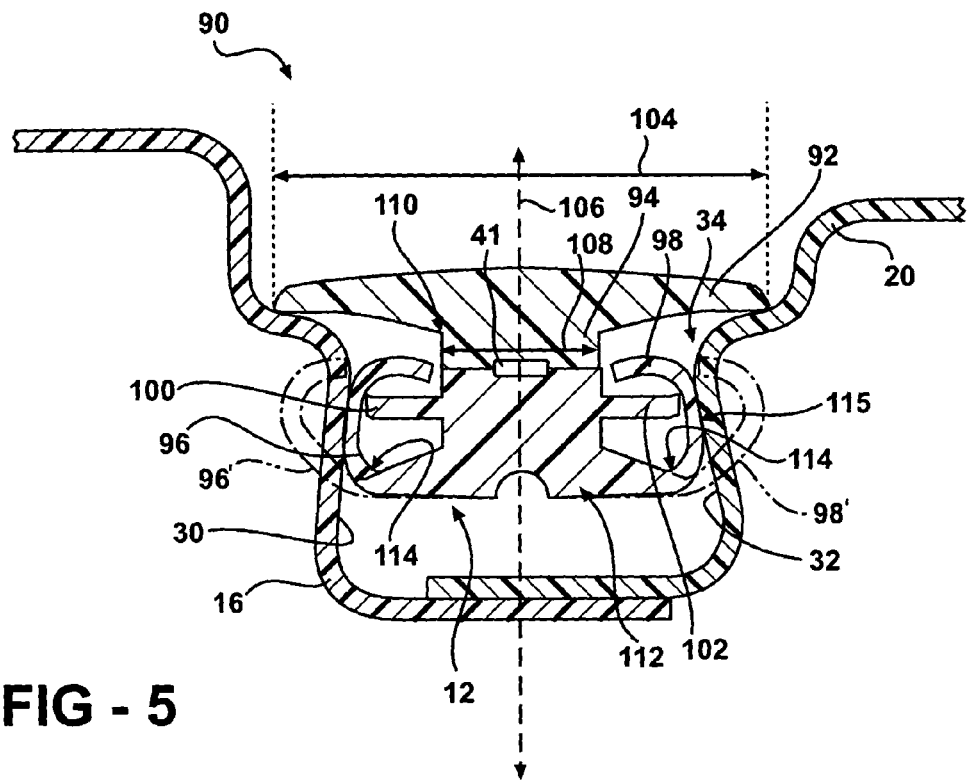
FIG. 5 is a fragmentary cross-sectional view of a second alternative embodiment of a molding member in accordance with the present invention shown installed in the recess of FIG. 1.

Referring now to FIG. 5, a second alternative embodiment of a molding in accordance with the present invention is indicated generally at 90. The molding 90 is adapted to be installed in the recess 12 and includes a head portion 92, a stem portion 94, a first leg member 96, a second leg member 98, a third leg member 100, and a fourth leg member 102. The head portion 92 extends in a first plane that is substantially parallel to the longitudinal axis 40 of the recess 12, best seen in FIG. 2. The head portion 90 has a width 104 sufficient to close the opening 34 when the molding 90 is installed in the recess 12. The stem portion 94 is preferably formed of a harder plastic material and extends in a second plane 106 at an angle relative to the first plane and has a width 108 enabling the stem portion 94 to pass through the opening 34. The stem portion 94 includes a first longitudinal edge 110 and a second longitudinal edge 112. The head portion 92 is attached at the first longitudinal edge 110 of the stem portion 94. The leg members 96 and 98 are preferably formed of a softer plastic material and extend outwardly from opposite sides of the stem portion 94 adjacent to the second longitudinal edge 112 of the stem portion 94 for frictional engagement with the opposed side walls 30 and 32 of the recess 12. The leg members 100 and 102 are preferably formed of a harder plastic material, such as the harder plastic material of the stem portion 94. The leg members 100 and 102 extend outwardly from opposite sides of the stem portion 94 intermediate the first longitudinal edge 110 and the second longitudinal edge 112. The first leg member 96 and the second leg member 98 are shown in a deflected, engaged position in the recess 12. An imaginary line 96' and an imaginary line 98' show the location of the first leg member 96 and the second leg member 98 in an extended, pre-engaged position prior to insertion into the recess 12. A living hinge portion 114 is formed in each of the leg members 96 and 98 to facilitate folding. The molding 90 is preferably co-extruded in one piece, and the head portion 92 alternatively includes a metallic foil or wire (not shown) disposed therein.

The molding 90 includes a reinforcement member 41, such as metal foil or a metal wire, extending longitudinally therethrough. The reinforcement member 41 is operable to provide stiffness to the molding 90 and to constrain the plastic material of the molding 90 from thermal expansion.

When the second longitudinal edge 112 of the stem portion 94 is inserted into the recess 12 through the opening 34, the leg members 96 and 98 bend toward the stem portion 94, at their respective living hinge portions 114, to pass through the opening 34. After passing through the opening 34, the leg members 96 and 98 frictionally engage the leg members 100 and 102 and the opposed walls 30 and 32 of the recess 12 with a slight interference fit to retain the molding 90 in the recess 12. The leg members 100 and 102 press against the folded leg members 96 and 98 and thus create additional pressure to the opposed walls 30 and 32 of the recess 12. The harder leg members 100 and 102 also reduce the lateral movement of the molding 90 once installed in the recess 12, thus absorbing the lateral variation created by the recess 12. An exterior surface of the leg members 70 and 72 is alternatively provided with a textured surface 115 to increase the coefficient of friction between the engaging surfaces of the leg members 96 and 98 and the opposed walls 30 and 32 and increase the retaining force of the molding 90.

Figure 6:
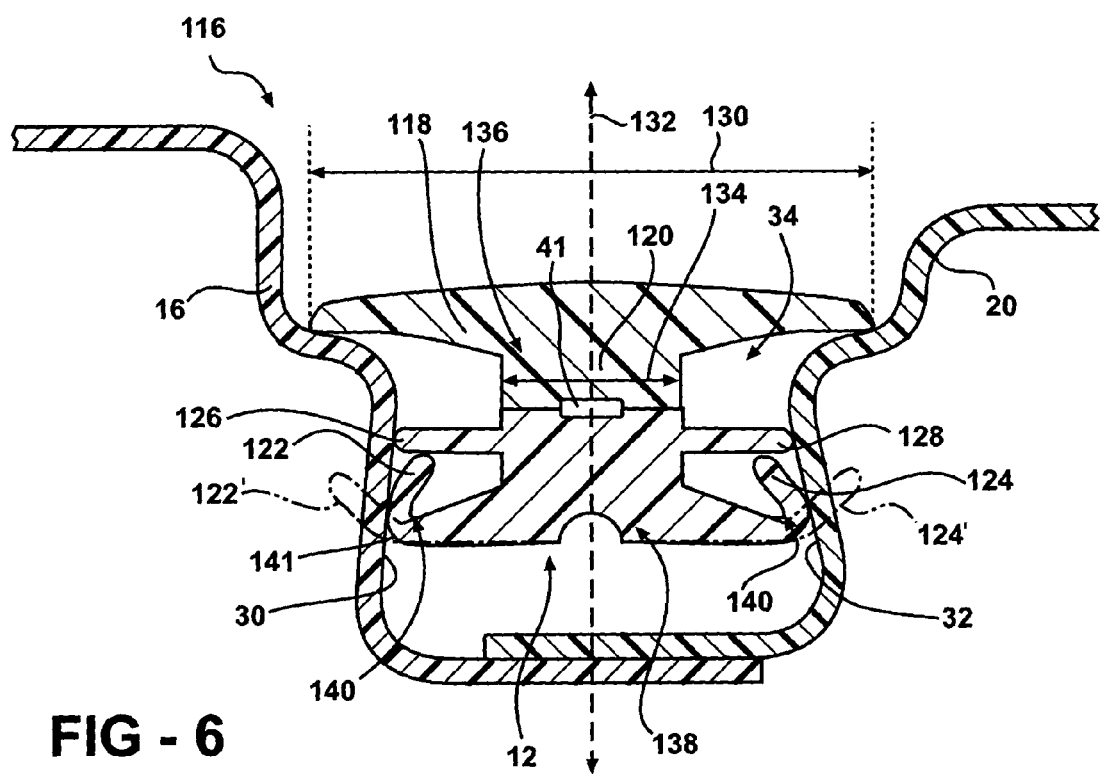
FIG. 6 is a fragmentary cross-sectional view of a third alternative embodiment of a molding member in accordance with the present invention shown installed in the recess of FIG. 1.

Referring now to FIG. 6, a third alternative embodiment of a molding in accordance with the present invention is indicated generally at 116. The molding 116 is adapted to be installed in the recess 12 and includes a head portion 118, a stem portion 120, a first leg member 122, a second leg member 124, a third leg member 126, and a fourth leg member 128. The head portion 118 extends in a first plane that is substantially parallel to the longitudinal axis 40 of the recess 12, best seen in FIG. 2. The head portion 118 has a width 130 sufficient to close the opening 34 when the molding 116 is installed in the recess 12. The stem portion 120 is preferably formed of a harder plastic material and extends in a second plane 132 at an angle relative to the first plane and has a width 134 enabling the stem portion 120 to pass through the opening 34. The stem portion 120 includes a first longitudinal edge 136 and a second longitudinal edge 138. The head portion 118 is attached at the first longitudinal edge 136 of the stem portion 120. The leg members 122 and 124 are preferably formed of a softer plastic material and extend outwardly from opposite sides of the stem portion 120 adjacent to the second longitudinal edge 138 of the stem portion 120 for frictional engagement with the opposed side walls 30 and 32 of the recess 12. The leg members 126 and 128 are preferably formed of a harder plastic material, such as the harder plastic material of the stem portion 120. The leg members 126 and 128 extend outwardly from opposite sides of the stem portion 120 intermediate the first longitudinal edge 136 and the second longitudinal edge 138. The first leg member 122 and the second leg member 124 are shown in a deflected, engaged position in the recess 12. An imaginary line 122' and an imaginary line 124' show the location of the first leg member 122 and the second leg member 124 in an extended, pre-engaged position prior to insertion into the recess 12. A living hinge portion 140 is formed in each of the leg members 122 and 124 to the stem portion 120. The molding 116 is preferably co-extruded in one piece, and the head portion 118 alternatively includes a metallic foil or wire (not shown) disposed therein.

The molding 116 includes a reinforcement member 41, such as metal foil or a metal wire, extending longitudinally therethrough. The reinforcement member 41 is operable to provide stiffness to the molding 116 and to constrain the plastic material of the molding 116 from thermal expansion.

When the second longitudinal edge 138 of the stem portion 120 is inserted into the recess 12 through the opening 34, the leg members 122 and 124 bend toward the stem portion 120, at their respective living hinge portions 140, to pass through the opening 34. After passing through the opening 34, the leg members 122 and 124 spring away from the stem portion 120 to frictionally engage the opposed walls 30 and 32 of the recess 12 to retain the molding 116 in the recess 12. The distance between the outer edges of the leg members 126 and 128 is slightly greater than the width of the opening 34 so that the leg members deflect upwardly as the molding 116 is inserted into the recess 12. The leg members 126 and 128, after passing through the opening 34, create an audible click as they snap back, which provides the installer an auditory cue that the molding 116 is engaged fully in the recess 12. The harder leg members 126 and 128 also reduce the lateral movement of the molding 116 once installed in the recess 12, thus absorbing the lateral variation created by the recess 12. An exterior surface of the leg members 122 and 124 is alternatively provided with a textured surface 141 to increase the coefficient of friction between the engaging surfaces of the leg members 122 and 124 and the opposed walls 30 and 32 and increase the retaining force of the molding 116.

Figure 7:
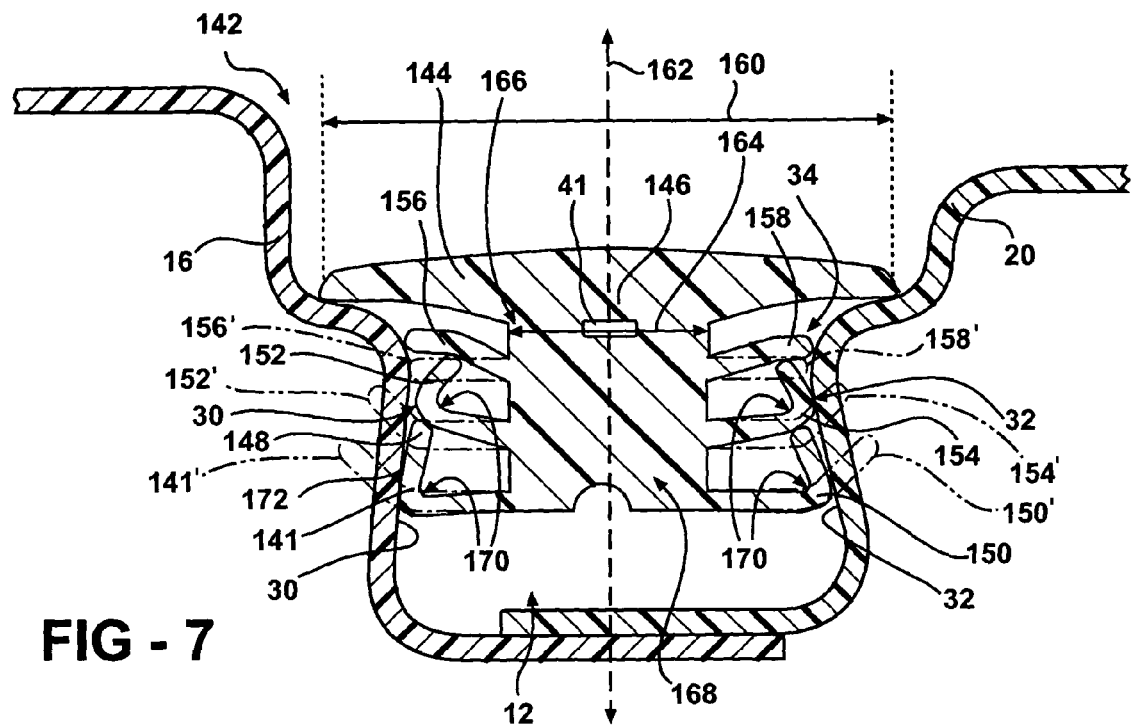
FIG. 7 is a fragmentary cross-sectional view of a fourth alternative embodiment of a molding member in accordance with the present invention shown installed in the recess of FIG. 1.

Referring now to FIG. 7, a fourth alternative embodiment of a molding in accordance with the present invention is indicated generally at 142. The molding 142 is adapted to be installed in the recess 12 and includes a head portion 144, a stem portion 146, a first leg member 148, a second leg member 150, a third leg member 152, a fourth leg member 154, a fifth leg member 156, and a sixth leg member 158. The head portion 144 extends in a first plane that is substantially parallel to the longitudinal axis 40 of the recess 12, best seen in FIG. 2. The head portion 142 has a width 160 sufficient to close the opening 34 when the molding 142 is installed in the recess 12. The stem portion 146 is preferably formed of a harder plastic material and extends in a second plane 162 at an angle relative to the first plane and has a width 164 enabling the stem portion 146 to pass through the opening 34. The stem portion 146 includes a first longitudinal edge 166 and a second longitudinal edge 168. The head portion 144 is attached at the first longitudinal edge 166 of the stem portion 146. The leg members 148 and 150 are preferably formed of a softer plastic material and extend outwardly from opposite sides of the stem portion 146 adjacent to the second longitudinal edge 168 of the stem portion 146 for frictional engagement with the opposed side walls 30 and 32 of the recess 12. The leg members 152, 154, 156, and 158 are preferably formed of a softer plastic material, such as the softer plastic material of the leg members 148 and 150. The leg members 152 and 154 extend outwardly from opposite sides of the stem portion 146 intermediate the first longitudinal edge 166 and the leg members 148 and 150. The leg members 156 and 158 extend outwardly from opposite sides of the stem portion 146 intermediate the leg members 152 and 154 and the first longitudinal edge 166. The leg members 152, 154, 156, and 158 are shown in a deflected, engaged position in the recess 12. An imaginary line 152', an imaginary line 154', an imaginary line 156', and an imaginary line 158' show the location of the leg members 152, 154, 156, and 158 in an extended, pre-engaged position prior to insertion into the recess 12. A living hinge portion 170 is formed in each of the leg members 148, 150, 152, and 154. The molding 142 is preferably co-extruded in one piece, and the head portion 144 alternatively includes a metallic foil or wire (not shown) disposed therein.

The molding 142 includes a reinforcement member 41, such as metal foil or a metal wire, extending longitudinally therethrough. The reinforcement member 41 is operable to provide stiffness to the molding 142 and to constrain the plastic material of the molding 142 from thermal expansion.

When the second longitudinal edge 168 of the stem portion 146 is inserted into the recess 12 through the opening 34, the leg members 148, 150, 152, and 154 bend toward the stem portion 146, at their respective living hinge portions 170, to pass through the opening 34. After passing through the opening 34, the leg members 148, 150, 152, and 154 spring away from the stem portion 146 to frictionally engage the opposed walls 30 and 32 of the recess 12 together with the leg members 156 and 158, providing a plurality of engagement surfaces for retaining the molding 142 in the recess 12. An exterior surface of the leg members 148, 150, 152, 154, 156, and 158 is alternatively provided with a textured surface 171 to increase the coefficient of friction between the engaging surfaces of the leg members and the opposed walls 30 and 32 and increase the retaining force of the molding 142.

Figure 8:
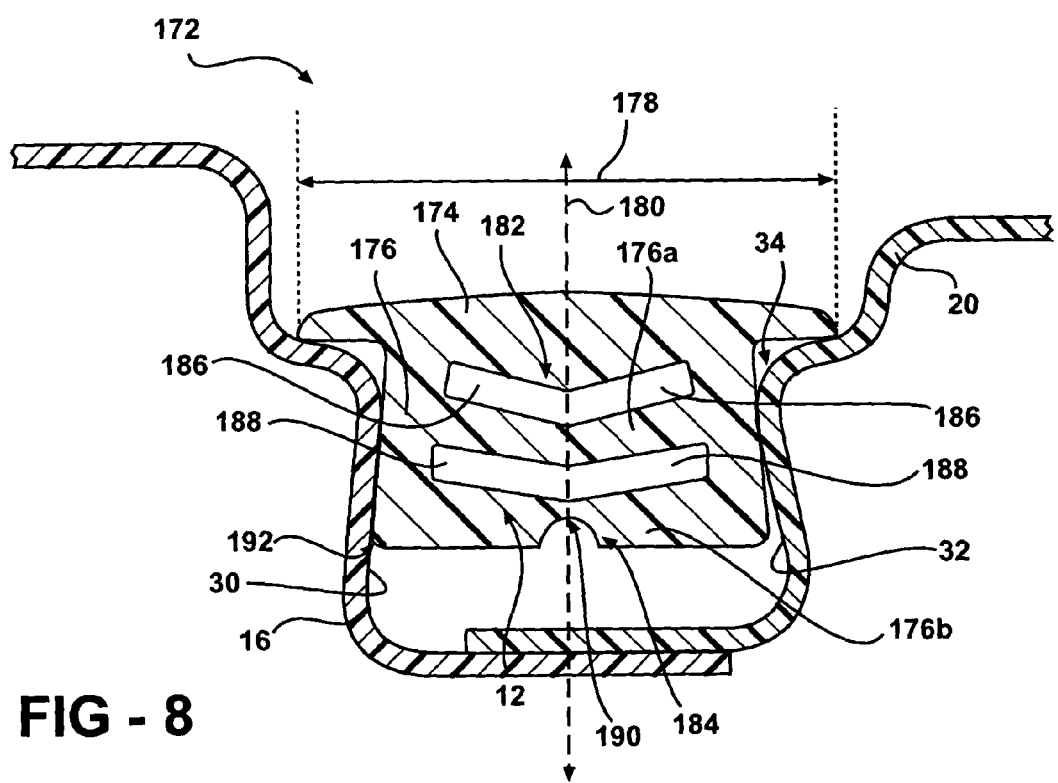
FIG. 8 is a fragmentary cross-sectional view of a fifth alternative another alternative embodiment of a molding member in accordance with the present invention shown installed in the recess of FIG. 1.

Referring now to FIG. 8, a fifth alternative embodiment of a molding in accordance with the present invention is indicated generally at 172. The molding 172 is adapted to be installed in the recess 12 and includes a head portion 174 and a stem portion 176. The head portion 174 extends in a first plane that is substantially parallel to the longitudinal axis 40 of the recess 12, best seen in FIG. 2. The head portion 174 has a width 178 sufficient to close the opening 34 when the molding 172 is installed in the recess 12. The stem portion 176 is preferably formed of a softer plastic material and extends in a second plane 180 at an angle relative to the first plane. The stem portion 176 includes a first longitudinal edge 182 and a second longitudinal edge 184. The head portion 174 is attached at the first longitudinal edge 182 of the stem portion 176. A first substantially horizontal void 186 and a second substantially horizontal void 188 are defined in the interior of the stem portion 176 intermediate the first edge 182 and the second longitudinal edge 184 defining a first leg member 176a and a second leg member 176b. A living hinge portion 190 is formed in a lower surface of the stem portion 176 adjacent the second longitudinal edge 184. The molding 172 is preferably co-extruded in one piece, and the head portion 174 alternatively includes a metallic foil or wire (not shown) disposed therein.

When the second longitudinal edge 184 of the stem portion 176 is inserted into the recess 12 through the opening 34, the stem portion 176 bends inwardly, at the living hinge portion 190, to enable the stem portion 176 to pass through the opening 34. After passing through the opening 34, the stem portion 176 springs back to frictionally engage the opposed walls 30 and 32 of the recess 12 to retain the molding 172 in the recess 12. A large portion of the exterior surface of the stem portion 176, therefore, frictionally engages with the opposed walls 30 and 32, which maximizes the engaging surface of the stem portion 176. If a force is applied to remove the molding 172 in the direction of the second plane 180, the material of the stem portion 176 adjacent the voids 186 and 188 will tend to deform outwardly, slightly increasing the effective width of the stem portion 176, which aids in retaining the molding 172 in the recess 12. The exterior surface of the stem portion 176 is alternatively provided with a textured surface 192 to increase the coefficient of friction between the engaging surfaces of the stem portion 176 and the opposed walls 30 and 32 and to increase the retaining force of the molding 172.

Each of the embodiments noted above will provide an increased retaining force for the molding and provide a molding operable to cover the opening 34 of the recess 12 and is easily press-fit into the recess 12. The deformable leg members, such as the leg members 46, 48, 70, 72, 96, 98, 122, 124, 148, 150, 152, 156, 176a and 176b absorb any lateral variation along the longitudinal axis 40 of the recess.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A molding for closing a roof ditch recess extending along joined edges of a pair of vehicle body panels, the roof ditch recess having opposed side walls divergently extending from an opening between outer surfaces of the panels, comprising:

a head portion extending in a first plane and having a width sufficient to close the opening when the molding is installed in the roof ditch recess;

a stem portion extending in a second plane at an angle relative to said first plane and having a width enabling said stem portion to pass through the opening, said head portion being attached at a first longitudinal edge of said stem portion, said stem portion being formed of a first predetermined hardness first plastic material;

at least a first leg member formed of a second predetermined hardness second plastic material softer than said first plastic material and extending outwardly from a side of said stem portion for frictional engagement with a side wall of the roof ditch recess, said at least a first leg member being hollow having first and second spaced apart wall sections connected together at one end and attached to said stem portion at an opposite end; and a living hinge formed in said at least a first leg member whereby when said stem portion is inserted into the roof ditch recess through the opening, said living hinge bends to permit said at least a first leg member to deflect toward said stem portion to pass through the opening and spring away from said stem portion when clear of the opening to frictionally engage the side wall of the roof ditch recess to retain the molding in the roof ditch recess;

wherein said second wall section has a textured outer surface for frictionally engaging the side wall of the roof ditch recess.

2. The molding according to claim 1 wherein said first plastic material and said second plastic material are different PVC materials.

3. The molding according to claim 1 including a reinforcement member extending longitudinally in at least one of said stem portion and said head portion.

4. The molding according to claim 3 wherein said reinforcement member is formed from one of a metal foil and a metal wire.

5. The molding according to claim 1 wherein said first wall section includes said living hinge.

6. A molding for closing a recess extending along joined edges of a pair of vehicle body panels, the recess having opposed side walls divergently extending from an opening between outer surfaces of the panels, comprising:
   a head portion extending in a first plane and having a width sufficient to close the opening when the molding is installed in the recess;
   a stem portion extending in a second plane at an angle relative to said first plane and having a width enabling said stem portion to pass through the opening, said head portion being attached at a first longitudinal edge of said stem portion, said stem portion being formed of a first predetermined hardness first plastic material;
   at least a first pair of leg members formed of a second predetermined hardness second plastic material softer than said first plastic material, said at least a first pair of leg members extending outwardly from opposite sides of said stem portion for frictional engagement with a respective side wall of the recess, said at least a first pair of leg members being hollow having first and second spaced apart wall sections connected together at one end and attached to said stem portion at an opposite end; and
   a living hinge formed in said at least a first pair of leg members whereby when said stem portion is inserted into the recess through the opening, said living hinge bends to permit said at least a first pair of leg members to deflect toward said stem portion to pass through the opening and spring away from said stem portion when clear of the opening to frictionally engage the respective side walls of the recess to retain the molding in the recess.

7. The molding according to claim 6 wherein said first plastic material and said second plastic material are different PVC materials.

8. The molding according to claim 6 including a reinforcement member extending longitudinally in at least one of said stem portion and said head portion.

9. The molding according to claim 8 wherein said reinforcement member is formed from one of a metal foil and a metal wire.

10. The molding according to claim 6 wherein said first wail section includes said living hinge.

11. The molding according to claim 6 wherein said second wall section has a textured outer surface for frictionally engaging the respective side walls of the recess.

12. The molding according to claim 6 wherein said recess is a roof ditch recess.

\* \* \* \* \*